United States Patent Office 3,431,873
Patented Mar. 11, 1969

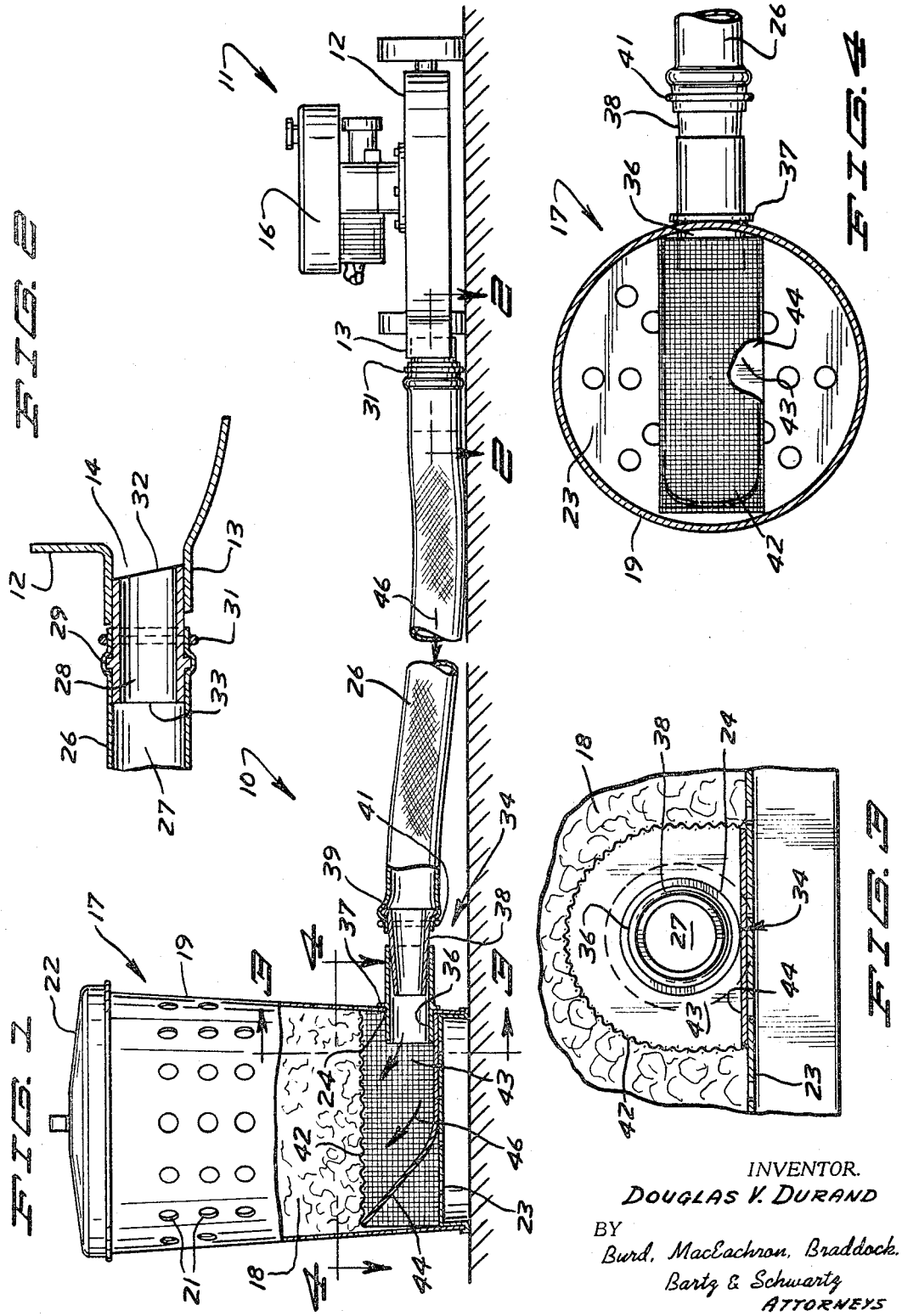

3,431,873
FORCED AIR BURNER
Douglas V. Durand, 3301 32½ Ave. NE.,
Minneapolis, Minn. 55418
Filed July 13, 1967, Ser. No. 653,154
U.S. Cl. 110—18       10 Claims
Int. Cl. F23g 5/00, 1/00; F23l 5/04

ABSTRACT OF THE DISCLOSURE

A rotary lawn mower combined with an upright trash burner for supplying a continuous stream of air to the bottom of the trash burner. A flexible cloth air tube attached at one end to a tubular coupling is used to direct air from the mower into the bottom of the burner. The opposite end of the air tube is attached to a tubular adapter designed to insert into a cylindrical receptacle positioned in a hole in the bottom of side wall of the burner. An inverted U-shaped screen and an upwardly directed deflector are located on the bottom of the burner in alignment with the receptacle so that air discharged into the burner is directed upwardly by the deflector through the screen to evenly disperse the air through the trash in the burner.

Background of invention

The invention relates to disposing of trash, leaves and like material by incineration induced by forced air. Heretofore, special machines have been designed to burn and increase the burning rate of trash material by introducing air into the combustion chamber. The leaf vacuum collector and burner shown in the patent to Boyer, No. 2,905,963 has a blower to gather the leaves and discharge the leaves along with air into the combustion chamber. The residue is collected in a bag attached to an outlet of the combustion chamber. This machine is specifically designed for a single purpose. There is very little control of the burning rate as the blower speed must be sufficient to pick up the leaves and discharge the leaves along with the air into the combustion chamber. The amount of air directed to the combustion chamber may exceed the volume which is needed for optimum burning. The forced air trash burner of this invention has overcome the disadvantages of these prior forced air trash burners.

Summary of invention

The invention is a trash burning system having a conventional rotary lawn mower and a trash container. The lawn mower has a housing formed with a material and air discharge opening. Spaced from the lawn mower is an upright container having a hole in the lower part allowing air to be introduced into the bottom of the container. The lawn mower is coupled with the container by an elongated tubular member. A first connection means attached to one end of the tubular member is retained in engagement with the mower housing in alignment with the material and air discharge opening. The opposite end of the tubular member is connected to a second connection means attached to and aligned with the hole in the container. On operation of the lawn mower air is discharge into the tubular member and directed by the tubular member into the bottom of the container. When trash and other material is located in the container and ignited, the forced air will aid in the combustion of the material so that damp material as grass and leaves which normally would not burn, can be disposed of by burning. The burning rate can be easily regulated by the speed of the engine of the rotary mower to either increased or decreased amounts of air supplied to the burner. In addition, the air intake hole in the bottom of the container alternatively serves as a clean out opening for ashes.

In the drawings:
FIGURE 1 is an elevation view partly in section of a forced air trash burner coupled to a rotary lawn mower;
FIGURE 2 is an enlarged plan view taken along the line 2—2 of FIGURE 1 showing the coupling connecting the tubular member with the housing of the lawn mower;
FIGURE 3 is an enlarged sectional view taken along the line 3—3 of FIGURE 1; and
FIGURE 4 is an enlarged sectional view taken along the line 4—4 of FIGURE 1.

Referring to the drawings, there is shown in FIGURE 1 the trash incinerating system of this invention indicated generally at 10. This system is designed to be portable and capable of disposing of combustible materials, as leaves, grass, weeds, twigs, wood and like materials, found in the ordinary yard. The trash incinerating system 10 is quick and effective in operation as it uses forced air to effect a more complete combustion of the trash. System 10 comprises a rotary type lawn mower 11 having a housing 12 formed with a discharge chute 13 for directing air and material from the lawn mower. Discharge chute 13 surrounds a discharge opening 14 leading from the inside of the housing used to enclose the rotary blade driven by a motor 16, as an internal combustion engine or electric motor. Lawn mower 11 may be any conventional lawn mower capable of generating a stream of air.

Spaced from lawn mower 11 is an upright container or burner indicated generally at 17 for storing trash 18 or other combustible material. Burner 17 has an upright generally cylindrical side wall 19 formed with a plurality of holes 21 permitting the escape of smoke and gases from within the container. A cover 22 resting on the top of the side wall closes the burner. A flat bottom wall 23 extends across the bottom of the containers slightly above the end of the side wall to allow air to flow under the container as well as up through holes in the bottom wall. Side wall 19 immediately above bottom wall 23 has a hole 24 used to allow air to be introduced into the bottom of the container as well as provide a clean out opening for material and ashes in the container.

The air discharged from lawn mower 11 is directed through an elongated tubular member 26 into the bottom of container 17. Tubular member 26 is a flexible tube of cloth, canvas, plastic or similar materials. Preferably, tubular member 26 is made of a non-combustible material. In use, the air from the rotary lawn mower 11 flows through the passage 27 in the tubular member into the bottom of container 17. A coupling or connecting sleeve 28 is used to connect one end of the tubular members 26 to the mower housing 13. Coupling 28 has a circumferential radial rib 29 which cooperates with an endless fastener 31 to hold the tubular member in assembled relation with the coupling. As shown in FIGURE 1, the tubular member extends over the radial rib 29 and is retained about the coupling by the fastener 31. Fastener 31 may be an elastic ring, an endless spring or cord providing for the quick removal of the tubular member from the coupling. The opposite ends of coupling 28 have different shapes to accommodate the different styles of lawn mowers. As shown in FIGURE 2, one end 32 of the coupling has the diagonal shape while the opposite end has a straight shape. It is apparent that coupling 28 may be attached to the tubular member in end-for-end positions according to the requirements of the particular lawn mower used in the trash incinerating system of this invention.

The opposite end of tubular member 26 is attached to a releasable connection indicated generally at 34 used to direct the air into the bottom of the container 17. Releasable connection 34 comprises a cylindrical sleeve or receptacle 36 projected through the hole 24 in the bottom of the side wall 19. Sleeve 36 has a radially outwardly directed rib 37 used to properly locate the sleeve in the hole 24. Rib 37 may be used to attach the sleeve to container side wall 19. Associated with sleeve 36 is a cylindrical adapter 38 having a slight inward taper and a radially outward directed flange 39 on its outer end. The cylindrical adapter 38 telescopes into the sleeve 36 and is retained there with a slight friction fit so that it may be readily removed for storage and for emergency reasons. The end of tubular member 26 fits over flange 39 and is retained there by a fastener 41 which is similar to the fastener 31.

Located within container 17 on bottom wall 23 is a porous member 42 forming a chamber 43 in communication with the inner end of cylindrical sleeve 36. The air is discharged into chamber 43 and flows through the porous member 42 upwardly into the trash 18 thereby aiding in the combustion and burning of the trash. Porous member 42, shown in FIGURE 3, is an inverted U-shaped member which extends diametrically across the bottom of the container so as to evenly disperse the air across the container. The porous member 42 may be an inverted U-shaped wire screen attached at its lower ends to the bottom wall 23. Alternatively, the inverted U-shaped wire screen may be merely supported on bottom wall 23 with one end of the screen over and in alignment with the inner end of the cylindrical sleeve 36. Positioned below the porous member 42 in chamber 43 is a curved deflector plate 44 which directs air upwardly. Plate 44 also provides a solid floor below the porous member so that all of the air introduced into chamber 43 must travel through the porous member into the trash 18.

In use, trash 18, as damp dead grass, leaves and the like, is placed in the container and initially ignited to commence the burning of the trash. Ordinarily damp material would not burn so that the wet material would cause the burner to rust. On the starting of operation of the lawn mower 11 with the tubular member 26 coupled at one end to the lawn mower and at the opposite end to the cylindrical sleeve 36, air indicated by arrows 46, is directed through the passage 27 of the tubular member into the chamber 43 formed by the porous member 42. The air is deflected upwardly by the deflector 44 through the porous member and into the trash 18. With the introduction of flowing air to the ignited trash, the rate of burning is increased in accordance with the amount of air supplied. This burning rate is conveniently regulated by controlling the speed of the engine of the rotary mower. The use of forced air to regulate the burning rate of the trash reduces air pollution as the forced air produces clean and efficient burning and a minimum of smoke. It is evident that the trash incinerating system of this invention encourages the burning of dead grass and leaves in an enclosed trash burner. This increases the fire safety practices of these materials incinerated in open locations. The trash burning system is relatively simple in design and easy to manufacture. The low cost, ease of use and versatility of the burner and the coupling to the lawn mower encourage its use by the average home owner.

While there has been shown and described a trash incinerating system having a particular lawn mower and a particular styled container or burner, it is to be understood that various omissions, substitutions and changes in the form of the lawn mower and burner as well as the other parts of the system may be made without departing from the spirit of the invention. For example, the lawn mower may be replaced with an air blower or fan and the burner may be a barrel. Also, the adapter 38 can be replaced with a tapered plug (not shown) to close the opening of sleeve 36 when the burner 19 is used without forced air. It is intended that the invention be limited only as indicated by the scope of the following claims.

The embodiments of the invention in which an exclusive property or privilege is claimed are defined as follows:

1. In combination, an upright container having a bottom wall and a side wall with a hole in the lower part thereof, an inverted U-shaped porous member within and on the bottom wall enclosing a chamber communicating with the hole, an upwardly curved deflector located under the porous member for directing air upwardly in the container and means for forcing air through said hole into the chamber above the deflector.

2. The combination of claim 1 wherein said container is a trash burner comprising an upright drum having a side wall, said hole being located in a lower part of the side wall.

3. The combination of claim 1 wherein said porous member is an elongated inverted U-shaped screen.

4. The combination of claim 1 including a tubular sleeve projected through said hole.

5. In combination, an upright container having a bottom wall and a side wall with a hole in the lower part thereof, an inverted U-shaped porous member supported on the bottom wall of the container, the opposite ends of the U-shaped porous member located in a contiguous relationship with the side walls of the container to enclose a chamber communicating with the hole, and means for forcing the air through said hole into the chamber, said air moving upwardly through the porous member to support a combustion of material located in the container above the porous member.

6. The structure of claim 1 wherein the means for forcing air through said hole into the chamber is a rotary lawn mower having a housing with a material and air discharge opening.

7. The structure of claim 6 including an elongated tubular member extended between the mower and the container, first connection means connecting one end of the tubular member with the mower housing with said one end of the tubular member aligned with the air discharge opening and second connection means connecting the other end of the tubular member with the container with said other end of the tubular member aligned with the hole in the container, whereby on operation of the mower, air is discharged into the tubular member and directed by the tubular member into the container.

8. The combination of claim 7 wherein said tubular member is formed of flexible material.

9. The combination of claim 7 wherein said first connection means is a tubular sleeve attached to the one end of the tubular member, said sleeve having a portion connectable with the mower housing.

10. The combination of claim 7 wherein said second connection means comprises a sleeve inserted in the hole of the container and a tube attached to the other end of the tubular member, said tube being of a size and length to telescope into the sleeve.

References Cited
UNITED STATES PATENTS

| | | | |
|---|---|---|---|
| 409,285 | 8/1889 | Hildreth | 110—74 |
| 1,827,910 | 10/1931 | Reed | 110—69 |
| 2,044,085 | 6/1936 | Laghetto | 110—18 |
| 2,164,262 | 6/1939 | Wagner | 110—71 |
| 2,905,963 | 9/1959 | Boyer | 110—18 X |
| 3,026,551 | 3/1962 | Smith | 110—19 X |

JAMES W. WESTHAVER, Primary Examiner.

U.S. Cl. X.R.

110—69, 71, 74